(No Model.)
G. BEATTY.
MANUFACTURE OF GLASSWARE.
No. 469,053. Patented Feb. 16, 1892.
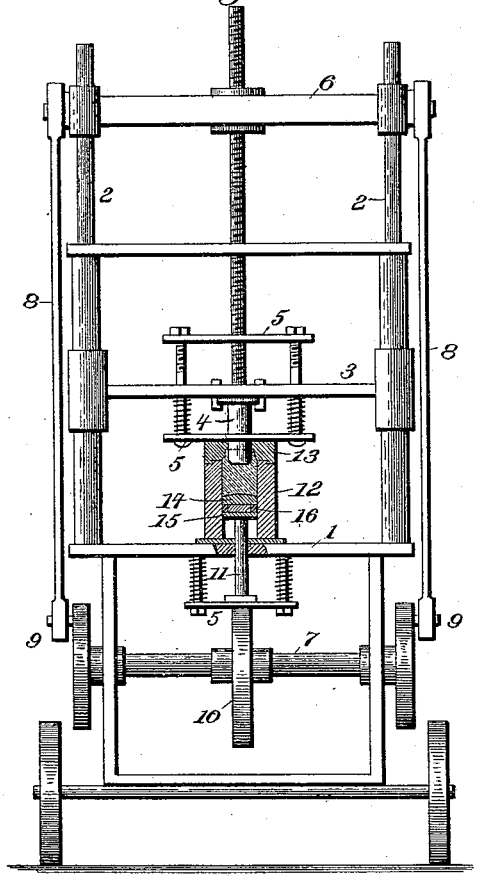
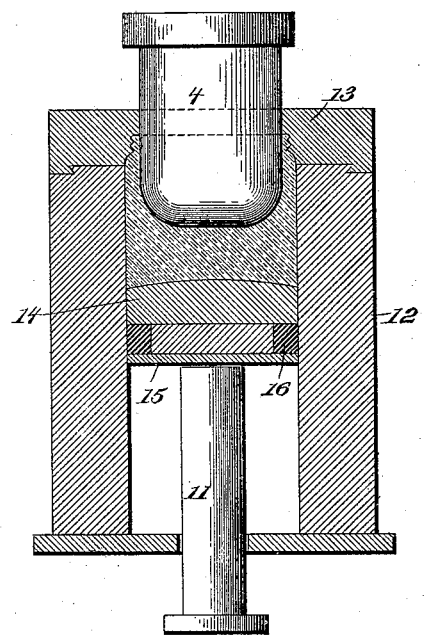
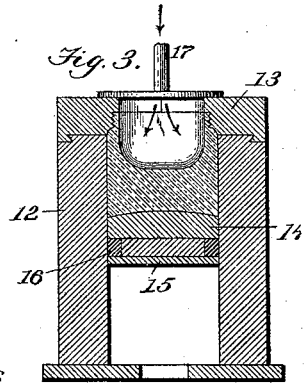
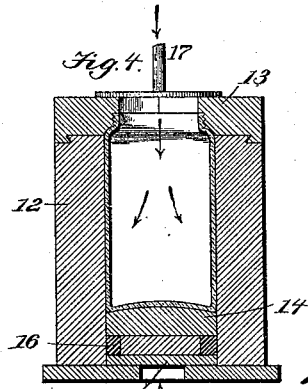
Witnesses  
Inventor  
George Beatty  
By Johnson & Johnson  
His Attorneys

UNITED STATES PATENT OFFICE.

GEORGE BEATTY, OF TIFFIN, OHIO.

MANUFACTURE OF GLASSWARE.

SPECIFICATION forming part of Letters Patent No. 469,053, dated February 16, 1892.

Application filed October 14, 1891. Serial No. 408,710. (No model.)

*To all whom it may concern:*

Be it known that I, GEORGE BEATTY, a citizen of the United States, residing at Tiffin, in the county of Seneca and State of Ohio, have invented a new and useful Improvement in the Manufacture of Glassware, of which the following is a specification.

My invention relates to improvements in the manufacture of glassware, in which the separate and distinct operations of casting or pressing and of blowing are combined in producing the complete article from the same piece of glass; and the object of my improvement is to provide for greater rapidity in producing the articles, to obtain uniformity of the ware produced, and to do away with much skilled labor now employed in the work.

An important advantage of my improvement is its adaptation for use in the press in general use in glass-factories, requiring only the addition to such press of provision for operating a lower vertically-movable stem for operating a movable bottom within the mold.

The invention primarily is directed to provision whereby a movable bottom is sustained within the chamber of the mold by a free lateral force or pressure exerted against the vertical walls of the latter to hold the bottom stationary when not acted upon by the bottom stem or by pressure above from the blow-pipe and to permit the bottom to be blown down with the glass to the fixed head of the mold when acted upon by the air-pressure from the blow-pipe to expand the soft glass in completing and shaping the body of the article within the mold. For this purpose it is necessary that the pressure of the air-blast shall be greater than the frictional resisting force of the movable bottom against the walls of the mold, so that the bottom is thus caused to descend in the exact ratio of the downward expansion of the article being formed. This construction and operation gives the advantage of holding the movable bottom in its descent in continuous contact with the soft glass as it is being expanded, and thereby gives greater uniformity to the thickness of the ware and dispenses with the skilled labor required to control the descent of a movable bottom by a lever or other positively-operated support controlled by the workman.

The following description, read in connection with the accompanying drawings, will enable persons skilled in the art to which my invention relates to understand its nature and to practice it in the form in which I at present prefer to embody it; but it will be understood that my invention is not limited to the precise construction and relation of the devices herein illustrated and described, as my improvement may be used in different molds and in different presses without departing from the spirit of my invention and without exceeding the scope of the claims concluding this specification.

Referring to these drawings, Figure 1 shows in elevation so much of a glass-press as illustrates the operation of casting or pressing the mouth portion of the article, the completion of which is effected in the same mold under the subsequent operation of a blow-pipe. Fig. 2 shows in vertical section my improved mold enlarged and as used in the press; and Figs. 3 and 4 show my improved mold in vertical section as it is used under the operation of the blow-pipe to complete the article.

Referring to the drawings, let the numeral 1 indicate the press-table; 2, the frame-standards; 3, the cross-head which carries the upper plunger 4, the upper and lower spring-plates 5 5, and which is adapted to slide vertically on the frame-standards.

6 is the top yoke-bar, which connects the upper plunger cross-head with the yoke-bar.

7 is the lower rock-shaft, and 8 are the pitman-rods, which connect the yoke-bar with the rock-shaft, and it will be understood that the upper plunger is operated by the shaft pitman-rod connections by means of the usual hand-lever, (not shown,) which rods are connected with the eccentric crank-pins 9 9 on the rock-shaft, as in the glass-presses in general use of identical construction.

To operate with my improved mold the only addition I make to this press is the placing of an eccentric or cam 10 on the rock-shaft for operating the lower spring-plate, which carries a stem 11, which extends through an opening in the press-table and into and through an opening in the bottom of the mold, so that the upper plunger and the lower stem will be caused to move simultaneously toward each other into the mold and withdrawn therefrom by the operation of the rock-shaft and its pitman-rod and yoke-bar connections in the operation of pressing the mouth portion of the article.

The mold I prefer to make of a solid casting 12, and is shaped in its forming-chambers to produce fruit-jars and bottles, the walls of which within the limits of the movable bottom are straight and parallel. The top of the mold is open and is provided with an open-and-shut ring 13, which has a central opening, through which the plunger passes, and an interior recess, which may be screw-threaded, for forming the screw-threaded necks of fruit-jars or the necks of bottles without screw-threads. The bottom of the mold has an opening into and through which the lower stem 11 passes. The mold is therefore only adapted for producing glass articles having straight and parallel sides because of my improvement in the provision of a movable bottom for the mold adapted to move over the walls and to exert thereon a laterally-frictional holding force. For this purpose I prefer to make the movable bottom of two parts 14 and 15, with an intervening annular space to receive a spring 16, which may be made in various ways; but in the instance shown it is made similar to the spring ring-packing for the piston-head of a steam-cylinder, it being only required that the tension of the spring against the walls of the mold shall give sufficient friction thereon to hold the bottom and the glass thereon in position up within the mold during the transfer of the mold from the press to the blow-pipe 17 and to permit the bottom to be blown down upon the end of the mold by the pressure of the air-blast delivered into the cavity formed in the soft glass in pressing the neck and mouth portion of the article. In this way the body of soft glass after having been pressed in the mold to form the neck and mouth is supported therein, when the mold is removed from the press and applied to the blow-pipe. In the casting or pressing operation it will be understood that the movable bottom is supported by the abutting action of the cam-operated stem against the pressure of the upper plunger, and that after the casting operation the plunger and lower stem are moved apart sufficiently to clear the mold and allow it to be removed from the press to the blow-pipe for the purpose stated. This means of supporting the glass within the upper portion of the chamber of the mold permits the latter to be used quickly and easily in the press and with the blow-pipe and the article to be completed in one and the same mold by merely shifting the latter from a pressing-machine to a blowing device, doing the work quickly and with ordinary labor and in such manner as to support the body of the glass under both operations and at every point of its expansion into complete shape. This, so far as I know and can find, has never been done before in the combined operations of pressing and blowing glassware.

It will be understood that the soft glass is dropped into the open mold by a gathering-iron, as in making any pressed glassware, the mold closed and put in the press, which is then operated to force the glass into the neck and mouth. As soon as the presser feels, through the action of the lever, that this is properly done, he reverses the action of the lever and this releases the mold, which is then removed to one side, and the air-pressure is immediately applied in the cavity in the glass made in the casting operation.

Referring to the function of the movable bottom, which renders it self-sustaining upon the walls of the mold and causes it to support the glass in the upper portion of the mold after the latter is removed from the press, it is important to notice that this self-sustaining function is of a uniform character, because the pressure of the frictional resistance of the movable bottom upon the walls of the mold is unvarying, and therefore the expanding force of the air-pressure and the descending movement of the bottom is so correlated and coacting as to give the best results in producing a uniform thickness in the walls of the article.

A new feature in the process which I have described resides in the provision wherein a movable mold-bottom has a vertical supporting-abutment under the pressing step of the operation and a lateral pressing frictional support under the blowing step of the operation, and this is the matter which distinguishes my invention from the process in which the depending mass of glass is supported in the blowing step of the operation by a bottom controlled in its descent by a manipulated lever, or by a process in which the expanding depending mass of glass has no bottom-support within the mold. My invention therefore comprehends, broadly, a press and blow-mold having a self-sustaining movable bottom for the purpose stated.

I therefore claim as my improvement the following:

1. In a mold for the manufacture of glassware, the combination of a movable bottom having a free lateral pressing frictional resistance upon the walls of the mold and a blow-pipe connection with the top of said mold, the said laterally-pressed frictional resistance being sufficient to sustain the movable bottom upon the walls and the dependent mass of glass when not under air-pressure, substantially as described.

2. In a glass-press, the combination of a vertically-acting upper plunger and a lower stem with a mold having a movable bottom provided with a free laterally-pressed frictional resistance, whereby the said bottom is rendered self-sustaining in contact with the dependent mass of glass upon the walls of the mold, substantially as described.

3. For the manufacture of glassware, the piston-bottom of a blow-mold rendered self-sustaining under the blowing operation by means of a uniform lateral frictional force exerted on the walls of the mold, for the purpose stated.

In testimony whereof I have signed this specification in the presence of two subscribing witnesses.

GEORGE BEATTY.

Witnesses:
ALEX KISKADDEN,
W. F. NOBLE.